US008938565B2

United States Patent
Aubertin et al.

(10) Patent No.: US 8,938,565 B2
(45) Date of Patent: Jan. 20, 2015

(54) SYNCHRONOUS OR ASYNCHRONOUS MULTI LAYER DATA LINK COMMUNICATION BETWEEN A MULTI-FUNCTIONAL DATA BUS INTERFACE AND A TRANSPONDER BYPASS FOR AUTOMOTIVE AFTERMARKET SECURITY SYSTEM AND/OR REMOTE CAR STARTER

(75) Inventors: Jean-Pierre Aubertin, Laval (CA); Martin Tessier, Laval (CA); Patrick Noël, Ste-Marthe-sur-le-Lac (CA)

(73) Assignee: Fortin Auto Radio Inc., St. Leonard (CA)

( * ) Notice: Subject to any disclaimer, the term of this patent is extended or adjusted under 35 U.S.C. 154(b) by 0 days.

(21) Appl. No.: 11/706,254

(22) Filed: Feb. 15, 2007

(65) Prior Publication Data

US 2007/0228827 A1    Oct. 4, 2007

Related U.S. Application Data

(60) Provisional application No. 60/773,331, filed on Feb. 15, 2006.

(51) Int. Cl.
| | |
|---|---|
| *G06F 13/00* | (2006.01) |
| *B60R 25/24* | (2013.01) |
| *G06F 19/00* | (2011.01) |
| *B60R 22/00* | (2006.01) |
| *B60R 25/04* | (2013.01) |
| *F02N 11/08* | (2006.01) |

(52) U.S. Cl.
CPC ............... *B60R 25/04* (2013.01); *B60R 25/24* (2013.01); *F02N 11/0807* (2013.01)

USPC ............... 710/100; 307/10.6; 340/5.72

(58) Field of Classification Search
USPC ............... 710/100; 307/10.6; 340/5.72
See application file for complete search history.

(56) References Cited

U.S. PATENT DOCUMENTS

| | | | | |
|---|---|---|---|---|
| 5,850,174 | A * | 12/1998 | DiCroce et al. | 340/426.28 |
| 5,878,211 | A * | 3/1999 | Delagrange et al. | 726/34 |
| 5,912,512 | A * | 6/1999 | Hayashi et al. | 307/10.5 |
| 6,045,156 | A * | 4/2000 | Spell et al. | 280/735 |
| 6,526,340 | B1 * | 2/2003 | Reul et al. | 701/29.3 |
| 6,798,339 | B2 * | 9/2004 | Thompson | 340/426.28 |
| 7,046,147 | B2 * | 5/2006 | Stigall | 340/572.1 |
| 7,152,133 | B2 * | 12/2006 | McClure et al. | 710/315 |
| 7,224,083 | B2 * | 5/2007 | Flick | 307/10.6 |
| 7,334,041 | B2 * | 2/2008 | Swindells et al. | 709/230 |
| 7,369,936 | B2 * | 5/2008 | Flick | 701/113 |
| 7,408,445 | B1 * | 8/2008 | Cunningham | 340/425.5 |

(Continued)

FOREIGN PATENT DOCUMENTS

CA    2434846 A1    12/2003

*Primary Examiner* — Paul R Myers
*Assistant Examiner* — Christopher A Daley
(74) *Attorney, Agent, or Firm* — Goudreau Gage Dubuc Gonzalo Lavin

(57) ABSTRACT

A multi layer data link communication system for a vehicle having a remote starter/alarm system, a vehicle computer and an OEM security interface. The system includes a multi-functional data bus interface module for sending control commands to the vehicle computer. The system also includes a transponder bypass module in communication with the OEM security interface and the multi-functional data bus interface module for transmitting and receiving authorization commands from the OEM security interface.

9 Claims, 1 Drawing Sheet

(56) References Cited

U.S. PATENT DOCUMENTS

| | | | |
|---|---|---|---|
| 7,545,255 B2 * | 6/2009 | Ohtaki et al. | 340/5.72 |
| 2004/0135435 A1 * | 7/2004 | Nelson | 307/10.3 |
| 2004/0239483 A1 * | 12/2004 | Flick et al. | 340/5.72 |
| 2005/0179323 A1 * | 8/2005 | Flick | 307/10.6 |
| 2006/0211368 A1 * | 9/2006 | Wisnia | 455/3.06 |

* cited by examiner

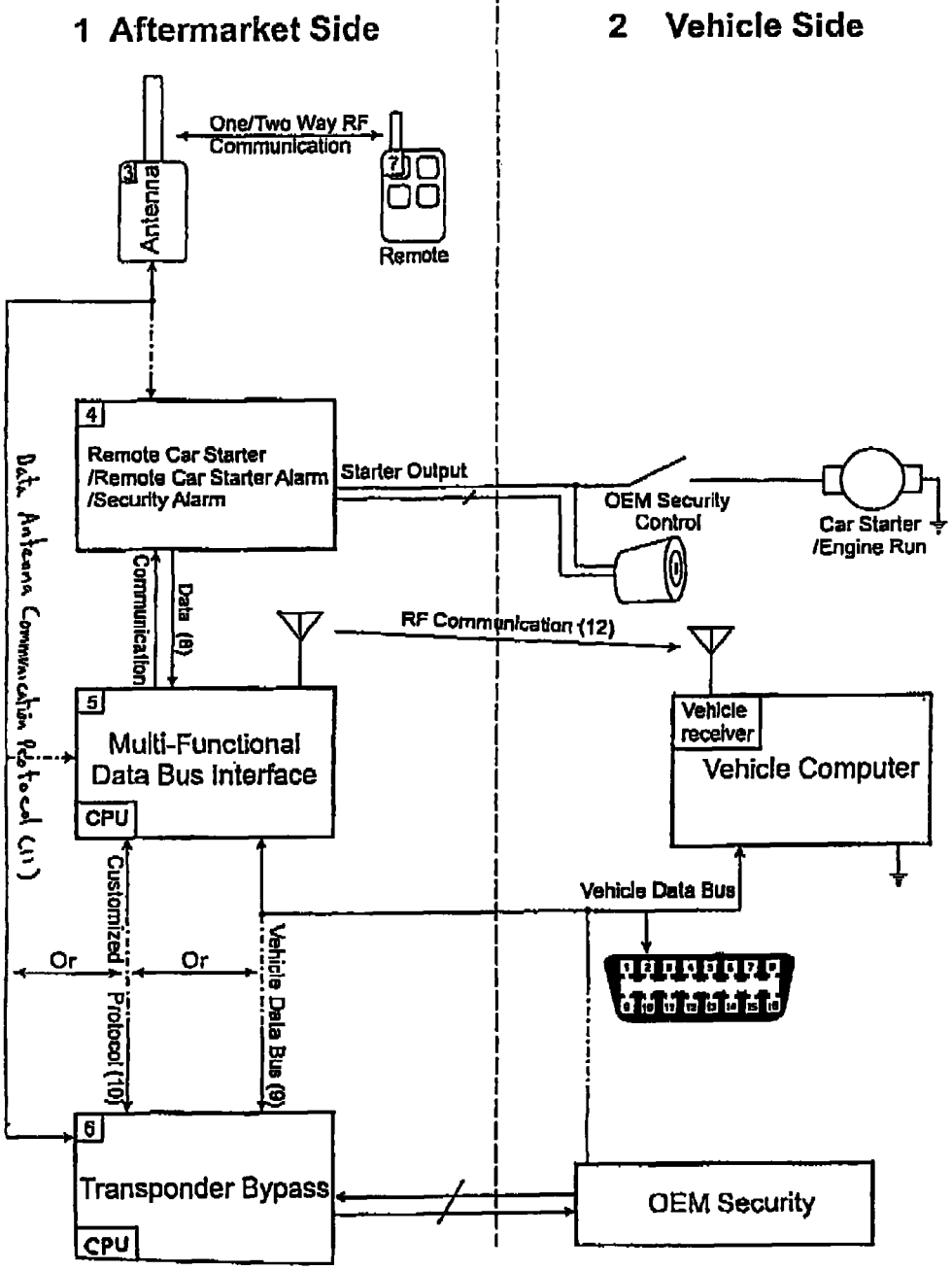

SYNCHRONOUS OR ASYNCHRONOUS MULTI LAYER DATA LINK COMMUNICATION BETWEEN A MULTI-FUNCTIONAL DATA BUS INTERFACE AND A TRANSPONDER BYPASS FOR AUTOMOTIVE AFTERMARKET SECURITY SYSTEM AND/OR REMOTE CAR STARTER

CROSS-REFERENCE TO RELATED APPLICATIONS

This application is a U.S. patent application, which claims benefit of U.S. provisional application Ser. No. 60/773,331, filed on Feb. 15, 2006, which is incorporated herein in its entirety by reference.

FIELD OF THE INVENTION

The present invention relates to an improvement to a multi-functional remote control system used in vehicles.

BACKGROUND OF THE INVENTION

A drawback of know remote control system is that it may be possible to steal the vehicle by shorting one or more from one of the aftermarket components wires to ground and/or the 12 V battery.

SUMMARY OF THE INVENTION

According to the present invention, there is provided a multi layer data link communication system for a vehicle having a remote starter/alarm system, a vehicle computer and an OEM security interface, comprising:

a multi-functional data bus interface module for sending control commands to the vehicle computer;

a transponder bypass module in communication with the OEM security interface and the multi-functional data bus interface module for transmitting and receiving authorization commands from the OEM security interface Preferably, there is provided a unidirectional and/or bidirectional multi layer data network protocol. This protocol allows a remote car starter or security system to receive and/or to transmit to a multi-functional data bus interface using communication codes to activate any command or function in a vehicle and/or to get status information from the vehicle to the remote car starter/security system. The multi-functional data bus interface can also transmit and/or receive information to/from a bypass interface thus allowing the vehicle to start and/or allowing the engine to continue to run without the use of a key. This multi layer network protocol prevents thieves from stealing the vehicle by shorting one or more from one of the aftermarket components wires to ground and/or 12V battery.

BRIEF DESCRIPTION OF THE DRAWING

FIG. 1 is a schematic bloc diagram of a multi layer data link communication system between a multi-functional data bus interface and a transponder bypass for automotive aftermarket security system and/or remote car starter system, according to a preferred embodiment of the present invention.

DETAILED DESCRIPTION OF THE INVENTION

Referring to FIG. 1, there is shown a diagram of a multi layer data link communication system between a multi-functional data bus interface and a transponder bypass for automotive aftermarket security system and/or remote car starter system, according to a preferred embodiment of the present invention. The system may include the following elements that are numbered accordingly in FIG. 1.

On the aftermarket side 1, there is shown aftermarket components 1 installed into a vehicle in order to start the engine or allow the engine to run without a key. By adding a remote car starter/security alarm 4, it is possible to control all the same features as the original key fob and more (ex. gas cap). It is also possible to simulate, the key inside the barrel by sending to the OEM security device the proper signal to receive permission to start the car. To do all these functions, it is possible that the installation takes one module to do all of the necessary functions.

On the vehicle side 2, there is shown the existing vehicle or electronic module in a vehicle that controls its functions through data communication or other means from commands received. It includes the car starter/engine run, the OEM Security Control, the vehicle computer with wireless vehicle receiver, the vehicle data bus and OEM Security interface.

Referring back to the aftermarket side 1, there is shown an antenna module 3 that receives and/or transmits data information to/from the remote car starter and one or more remote controls 4 and/or security alarm 4 and/or multi-functional data bus interface 5 and/or transponder bypass 6.

The remote car starter/remote car starter alarm/security alarm module 4 controls different commands required in functions to enable a vehicle do to certain functions necessary for the application required. This device can transmit and/or receive information to/from the multi-functional data interface 5 by using the data communication protocol 8. The received and/or transmitted information is used to control remote car starter/security alarm system function in the vehicle 2.

The multi-functional data bus interface module 5 is used to transmit information to the vehicle, either by RF 12 or by other means of wireless or wired communication to control the necessary functions. The multifunctional data interface's CPU receives and/or transmits commands to/from the remote car starter/security alarm 4 using data communication 8 and/or receive data from the antenna 3 using the data antenna communication network 11. After processing, the CPU sends data codes, using the vehicle data bus network 9 and/or some other customized network protocol 10, to the OEM transponder bypass CPU to get the authorization from the OEM security interface to allow the car starter to start the engine and/or allow the engine to continue to run.

The transponder bypass 6 allows the vehicle to start without using the OEM key when the remote car starter attempts to start the engine. This interface receives signal commands from the multi-functional data interface 5 and/or the antenna 3, from the vehicle data bus network 9 and/or the customized network protocol 10, and/or data antenna communication protocol 11 to give the authorization to the OEM security interface to start the engine and/or allow the engine to continue running.

On the aftermarket side 1, there is also shown a remote device 7 that transmits multiple signals, which activate a unit with a receiver in order to control different commands in the vehicle 2.

A data communication port RS232 or any protocol of communication with data 8 may be used in order to control the necessary functions, in the vehicle by remote command without affecting the vehicle's integrity. It is integrated with the remote car starter/security alarm 4 in order to be compatible with either single or multiple function 5 data bus interface(s)

(Canadian patent application no. 2,438,820) that produce the proper signal and transmit, to the vehicle control to control necessary functions and prevent thieves from stealing the vehicle 2 by shorting one or more of the aftermarket components wire(s) to ground and/or 12 V battery (ex. in remote starters).

The multi-functional data bus interface 5 may use the local vehicle unidirectional or bidirectional data bus 9 to communicate with the transponder bypass system 6. This method allows a secure way to communicate and prevent thieves from stealing the vehicle. The communication between the multi-functional data bus interface 5 and the transponder bypass 6 may either be encrypted or unencrypted.

The multi-functional data bus interface 5 may use any existing or custom data communication protocol 10 (RS232, PWM, analog) to communicate with the transponder bypass 6. This method allows a secure way for communication and prevents thieves from stealing the vehicle. The communication 10 between the multi-functional data bus interface 5 and the transponder bypass 6 may either be encrypted or unencrypted.

The transponder bypass 6 may use any signal 11 either outgoing or incoming from the antenna 3 to activate or report the status of a function. This method allows a secure way to communicate and prevent thieves from stealing vehicle.

The multi-functional data interface 12 can communicate and activate the necessary functions in the vehicle by using RF communication.

According to a variant of the present invention, it is possible to switch the order of the multi-functional data interface 5 and the transponder bypass 6 in the schematic bloc diagram of FIG. 1. This means that the transponder bypass 6 may receive a command from the remote car starter/security alarm 4 and send it back to the multi-functional data bus interface 5. The activation codes can be transmitted to the multi-functional data bus interface 5, on the existing vehicle data bus network 9 and/or on a customized network protocol 10 and/or wireless communication protocol 11.

Although preferred embodiments of the present invention have been described in detail herein and illustrated in the accompanying drawing, it is to be understood that the invention is not limited to these precise embodiments and that various changes and modifications may be effected therein without departing from the scope or spirit of the present invention.

The invention claimed is:

1. A multi layer data link communication system for aftermarket installation on a vehicle having an existing remote starter/alarm system, an existing vehicle data bus, an existing vehicle computer and an existing OEM security interface, comprising:
    a multi-functional data bus interface module having a central processing unit (CPU), said multi-functional data bus interface module being located outside from and externally connected to and in data communication with the existing remote starter/alarm system for sending control commands to the vehicle computer, said control commands comprising commands to start an engine of the vehicle, said multi-functional data bus interface module being aftermarket installed in the vehicle; and
    a transponder bypass module having a central processing unit (CPU), said transponder bypass module in communication with the OEM security interface and the multi-functional data bus interface module for transmitting and receiving authorization commands from the OEM security interface, said multi-functional data bus interface being aftermarket installed in the vehicle, wherein the transponder bypass module is connected to and in data communication with the multifunctional data bus interface module via a customized network protocol link or a data antenna communication protocol link, wherein the transponder bypass module allows the vehicle to start without using an OEM key associated with the existing remote starter/alarm system.

2. The multi layer data link communication system according to claim 1, wherein the remote starter/alarm system communicates with the multi-functional data bus interface module via a RS232 data communication port.

3. The multi layer data link communication system according to claim 1, wherein the multi-functional data bus interface module communicates to the transponder bypass module via the vehicle data bus.

4. The multi layer data link communication system according to claim 1, wherein the remote starter/alarm system is in communication with an antenna module.

5. The multi layer data link communication system according to claim 4, wherein the antenna module is in communication with the multi-functional data bus interface via a data antenna communication protocol.

6. The multi layer data link communication system according to claim 4, wherein the antenna module is in communication with the transponder bypass module via a data antenna communication protocol.

7. The multi layer data link communication system according to claim 1, wherein the multi-functional data bus interface module is in communication with a wireless receiver of the vehicle computer.

8. The multi layer data link communication system according to claim 1, wherein the remote starter/alarm system is in communication with the transponder bypass module.

9. A method for aftermarket installing a multi layer data link communication system on a vehicle having an existing remote starter/alarm system, an existing vehicle data bus, an existing vehicle computer and an existing OEM security interface, the method comprising:
    installing in the vehicle an aftermarket multi-functional data bus interface module having a central processing unit (CPU), said multi-functional data bus interface module being located outside from and externally connected to and in data communication with the remote starter/alarm system for sending control commands to the vehicle computer, said control commands comprising commands to start an engine of the vehicle; and
    installing in the vehicle an aftermarket transponder bypass module having a central processing unit (CPU), said transponder bypass module being in communication with the OEM security interface and the multifunctional data bus interface module for transmitting and receiving authorization commands from the OEM security interface, wherein the transponder bypass module is connected to and in data communication with the multifunctional data bus interface module via a customized network protocol link or a data antenna communication protocol link, wherein the transponder bypass module allows the vehicle to start without using an OEM key associated with the existing remote starter/alarm system.

* * * * *